United States Patent [19]

Börjesson et al.

[11] 4,074,422
[45] Feb. 21, 1978

[54] APPARATUS FOR HOLDING ELECTRODE SETS

[75] Inventors: Anders Börjesson, Alvangen; Tore Rehnberg, Nol, both of Sweden

[73] Assignee: Aktiebolaget Tudor, Sundbyberg, Sweden

[21] Appl. No.: 762,562

[22] Filed: Jan. 26, 1977

[30] Foreign Application Priority Data

Sept. 12, 1975 Sweden .................. 7513827

[51] Int. Cl.² ................................. H01M 2/14
[52] U.S. Cl. ............................. 29/730; 269/43; 269/321 WE
[58] Field of Search .............. 29/730, 731, 623.1; 164/DIG. 1; 269/43, 321 WE

[56] References Cited
U.S. PATENT DOCUMENTS

| | | | |
|---|---|---|---|
| 3,836,135 | 9/1974 | Wightman | 269/43 |
| 3,988,169 | 10/1976 | McLean | 29/623.1 |
| 4,016,638 | 4/1977 | Klein | 29/730 |

*Primary Examiner*—Carl E. Hall
*Attorney, Agent, or Firm*—Burns, Doane, Swecker & Mathis

[57] ABSTRACT

A holder for holding electrode sets during the manufacture of an electric battery includes a pair of spaced partition holders and a pair of spaced wedge holders. The wedges are coplanar with the partitions and are wider than the partitions. The partition holders and wedge holders are movable toward one another to close around sets of electrodes disposed therebetween. The wedges continue to travel in overlying relation relative to said partitions to hold the electrode sets tightly. The partition holders carry blades which penetrate separator elements of the electrode sets and bear against the electrodes to center the latter. A plurality of holders can be interconnected so as to be driven by a common power source.

12 Claims, 7 Drawing Figures

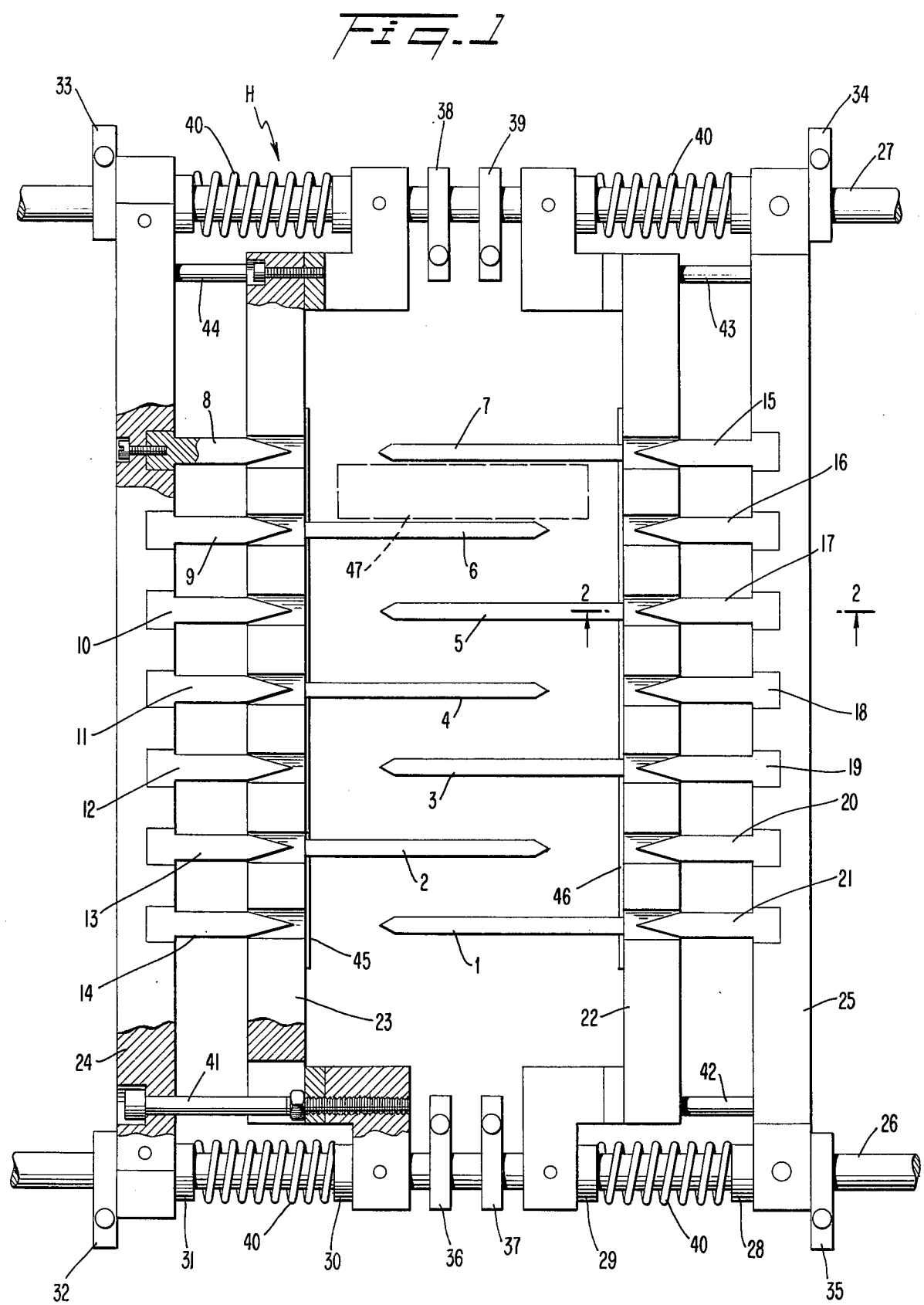

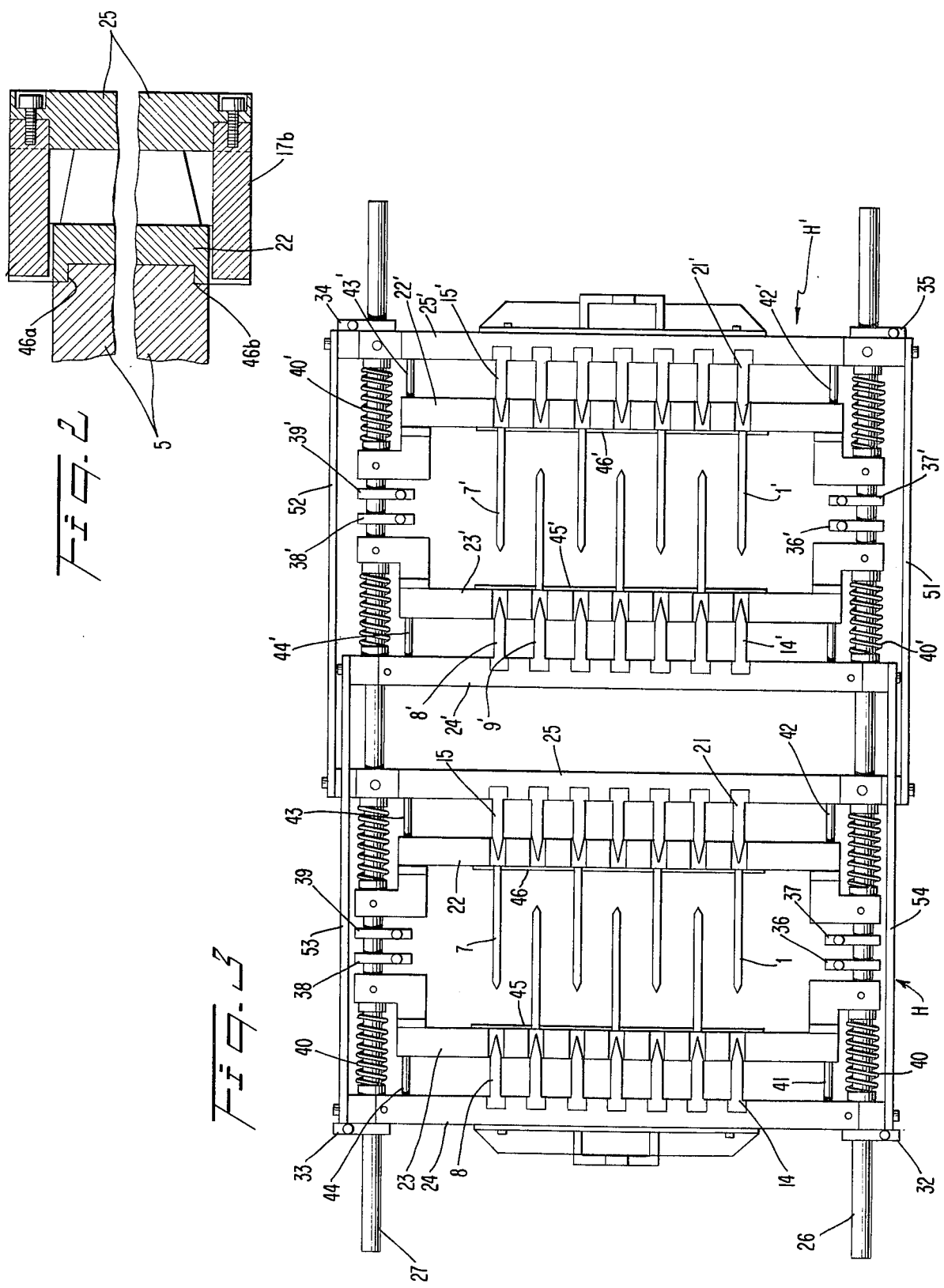

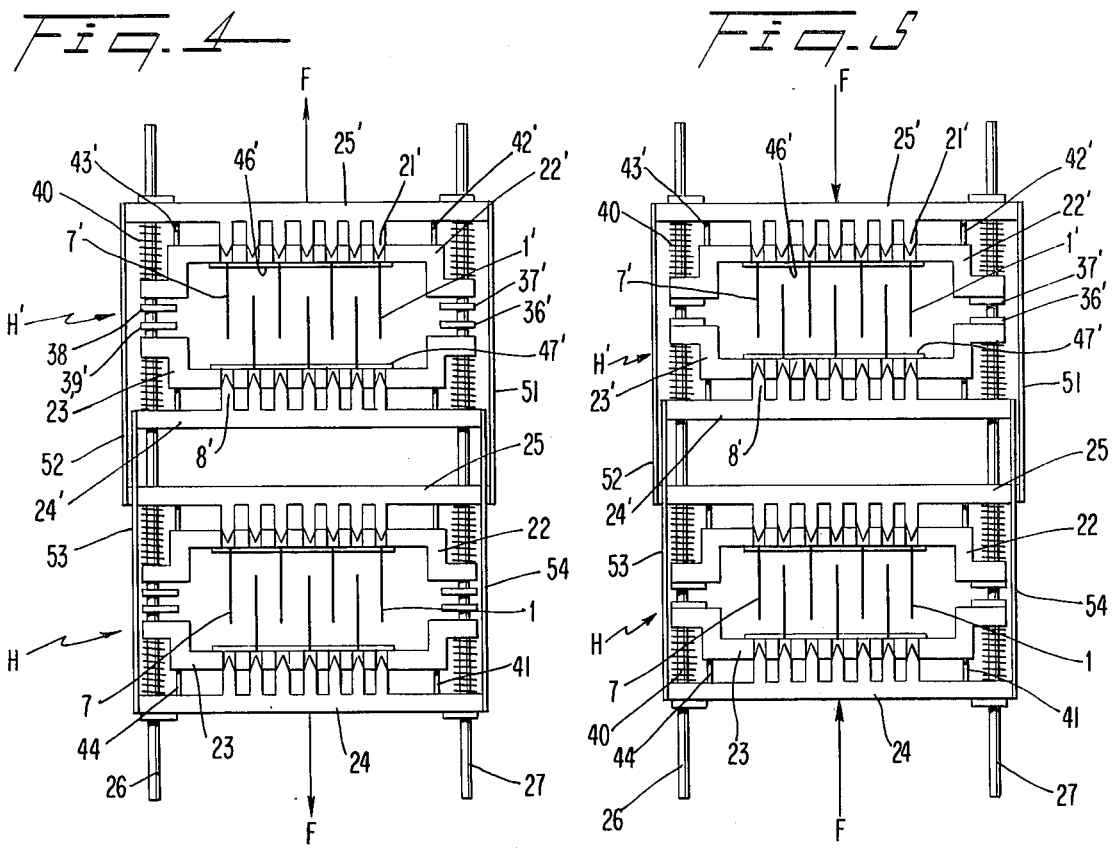
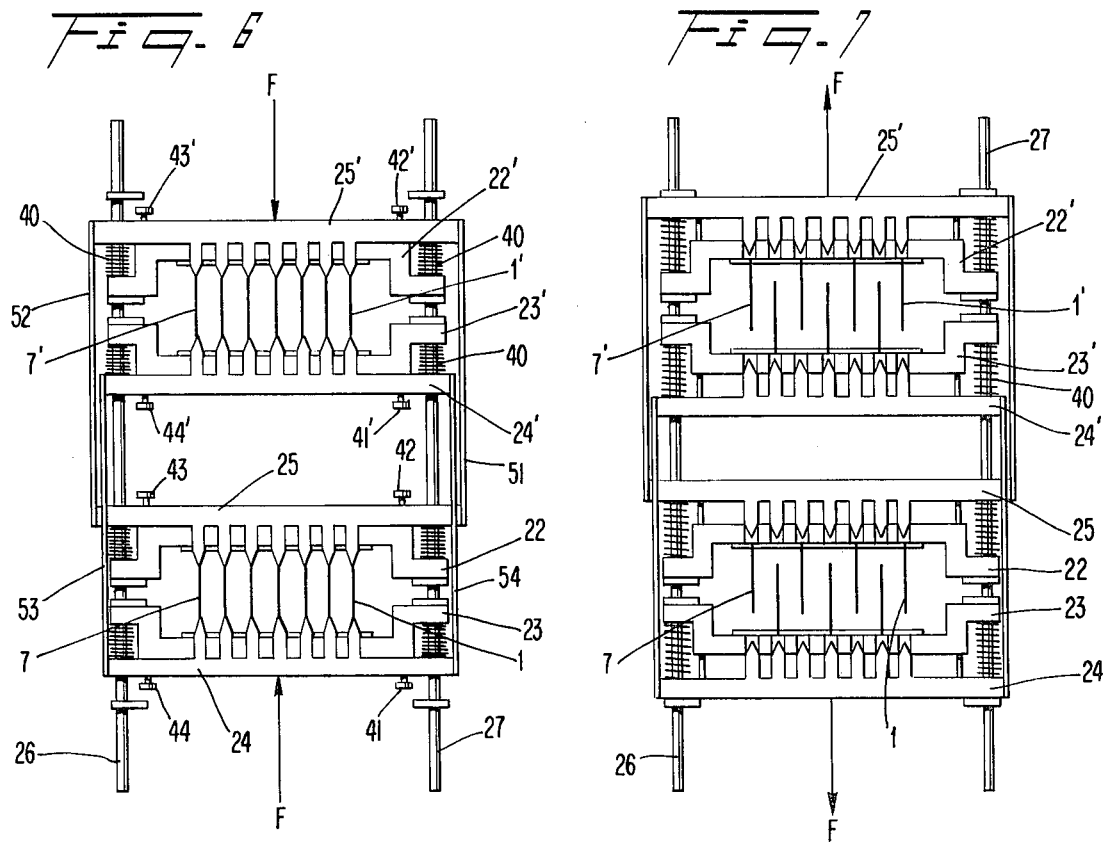

APPARATUS FOR HOLDING ELECTRODE SETS

BACKGROUND AND OBJECTS

The present invention concerns a device for holding electrode sets in connection with the production of electrical accumulators or batteries. The device is above all usable in the manufacture of electrode connectors and cell connectors in lead accumulators. The device, however, is also usable in the production of other accumulator types when one wishes to handle electrode sets in different ways.

In the manufacture of electrical accumulators, the components entering into the electrode set, i.e., positive and negative electrodes and separators, are all made separately. They are then brought together to form electrode sets, and one puts up connectors between electrodes of the same kind in each electrode set as well as between different cells in a battery. The construction of these connectors varies greatly, depending on which type of electrodes are used as well as on the cell's or battery's application and construction. Lead batteries are made either with several cell spaces in a common container or with a separate container for each cell. For certain applications a number of such separate cells can be brought together in a common tray or box. The device according to the invention can in all cases be used in connection with the handling of the electrode sets before they are placed in the respective cell jars or containers, and as a rule in connection with the production of the connector bars which connect the electrodes of the same type within each cell. The device can also be applied with the production of connectors between different cells in the battery where such connectors are made before the electrode sets are placed in the cell jar. Connector bars and cell connectors can then be made in the same work step.

Devices for casting connector bars as well as cell connectors in connection with them are known. Swedish Pat. No. 363,705 describes a device for the adjustment of the components entering into the electrode set in relation to one another, which device in its turn enters into a machine or device for the casting of connector bags. The adjusted electrode sets are held tight between two plates which exercise a certain contact pressure on them. This construction yields good results and is applicable if it is solely a question of casting connector bars, but difficulties arise if at the same time one wishes to cast connectors between different cells.

German Pat. No. 1,596,183 describes a device for the simultaneous casting of connector bars and cell connectors. The device includes a holder for electrode sets which is made in such a way that the electrode sets are placed in compartments, one for each set. Between the electrode sets there are elliptic staves or bars which are parallel with the electrodes when the sets are inserted in the compartments. When the sets are inserted, these staves are turned or twisted and clamp the electrode sets tight.

It is an object of the present invention to minimize or obviate problems of the type occurring with prior art proposals in this area.

It is another object of the present invention to provide a novel apparatus for holding electrode sets.

THE DRAWINGS

The device will now be described with reference to the preferred example of the invention shown in the accompanying figures in which:

FIG. 1 shows, in plan, a device according to the invention intended to be applied to the production of six-celled accumulator batteries;

FIG. 2 shows a section through a part of the device taken along line 2—2 in FIG. 1;

FIG. 3 shows two parallel devices of the same type as FIG. 1; and

FIGS. 4–7 show different steps in a work cycle.

DETAILED DESCRIPTION OF PREFERRED EMBODIMENT

The set holder H shown in FIG. 1 is provided with a number of partitions 1–7, which are attached by movable arms 22 and 23. These will hereafter be called partition holders. Wedges 8–21 are attached to movable members 24 and 25, which from now on will be called wedge holders. The wedges include upper and lower portions, e.g., see portions 17a, 17b in FIG. 2, which are disposed above and below the associated coplanar partitions. Each wedge is movable in the plane coinciding with the partitions. The width of the wedges in a direction perpendicular to a plane in which such movement takes place is greater than the width of the partitions in the same direction.

For the adjustment of the electrode sets, so that the electrodes and separators have the right position with respect to one another, the partition holders are provided with blades 45 and 46. The blades include upper and lower razor-like edges (e.g., see edges 46a, 46b in FIG. 2) which project from the partition holders for a distance that corresponds to the distance the separators must project beyond the electrodes on each side of the respective electrodes. When the set holder is closed in connection with a work cycle to be described below, the blades penetrate the separators and lie in close contact with the edges of the electrodes. This results in a centering of the electrodes in relation to the separators. This centering takes place in what must be called the horizontal direction of the electrodes. In the vertical direction of the electrodes, the centering can occur either in a corresponding manner or, for example, by providing the electrodes in the usual manner with downward thrusting feet which together with the separators come to rest on the bottom plate. Such arrangements are not shown in the figures and do not make part of the invention.

In FIG. 2, the relative position of the wedge 17a, 17b and partition 5 is depicted. It will be apparent that the wedge sections straddle the partition.

In FIG. 3 are shown two set holders H, H' according to the invention, which work together. The working together is obtained by having corresponding wedge holders of the set holders H, H' connected mechanically with one another by means of rods 51–54. As the movements of the wedge holders in turn affect the partition holders in a way which will be described later, a simultaneous and similar operation is obtained for the two set holders. Of course it is possible to couple together any desired number of set holders in one and the same machine.

In FIGS. 4–7 are shown the various positions which according to the invention are assumed by the set holders during a work cycle. The forces which are to work upon the set holder are represented by arrows which indicate their direction; they are marked F. When electrode sets 47 are placed in the set holder, the latter is open, as shown in FIGS. 4 and 1. The electrode sets can be inserted manually or automatically. When all the electrode sets have been placed in their respective spaces, the set holder is shut. In the first moment of the shutting, both the partition holders and the wedge holders move in toward the electrode sets. The blades 46, 47 then penetrate the separators and they center parts of the electrode sets with respect to one another.

The movement-causing force is applied to the wedge holder and is transferred from it to the partition holder by way of several springs 40. These springs are so dimensioned that the distance between the wedge holder and the partition holder remains constant in the main during the entire first shutting moment. This moment is concluded as soon as the partition holders reach the stopping blocks 36–39 (FIG. 5). The position of the stopping blocks is chosen so that the distance between the partition holders in the shut position corresponds to the width of the separators in the electrode sets. The first part of the shutting movement being complete, all the electrode sets are properly arranged.

Thereupon a locking of the position for the electrode sets takes place, due to the circumstances that the movement of the wedge holders is continued until it is stopped or blocked by the partition holders. The wedges move in straddling relation to the partitions and pass between the electrode sets and fix the components of the latter with respect to one another and at a distance from one another which corresponds to the distance which is to be present in the finished battery. While the electrode sets are held fast in this manner, such work operations as the casting of connector bars, etc., take place.

Thereupon, the set holder is brought to the location in which the electrode sets are to be removed from the set holder. The latter is opened at the same time that wedge holders are drawn apart. The wedge holders pull the partition holders with the help of bolts 41 and 44, which determine the practicable distance between partition holders and wedge holders. Thereby the electrode sets are freed and can either be removed from the set holder if the latter is provided with a bottom, or can be dropped from the set holder. The latter is constructed in such a way that the electrode sets can fall through the set holder, as the partitions do not come close to the partition holders but leave a space for possible cell connectors. The bolts 41, 44 also serve to adjust the pre-tension of the springs 40.

A production form of the invention has been described above. Other types can be imagined without deviating from the idea of the invention. The essential point is that the electrode sets, after their components have been arranged with respect to one another, are held tight with the help of wedges which are movable in a plane that coincides with the plane for the partitions that bound the electrode sets intended for different cells. The wedges must also have a greater width of thickness perpendicular to this plane that the partitions. The partitions can, of course, be stationary, but by employing movable partitions, as in the above-described form, greater functional precision is obtained as well as a simpler type of construction. Even if the partitions are stationary, it is a characteristic of the invention that other than the wedges there is present some type of movable organ that serves to arrange the components of the electrode set. These organs are named partition holders in the above description as well as in the text below. This name has been chosen, because it represents the preferred type embodiment, but in certain other modifications it may be used figuratively.

It is also possible to attach bottom plates to the partition holders or to the wedge holders so that when the set holder is closed, the bottom plates will underlie the electrode sets and form a floor therefor.

The electrode set holder of the present invention offers several advantages over previously devices. It has only a small number of movable parts and can be geared to batteries with any number of cells without an increase in the number of movable parts. It also makes it possible for the electrode set to pass through the device, i.e., the electrode set is conveyed in one direction, and after the conclusion of the work operation the electrode set is removed in the same direction through the device.

A further advantage is that several similar devices can operate in parallel with an unchanged number of drive instruments. This means, for example, that if two driving cylinders are required for the maneuvering of one holder, there can take place an extension of the machine with several holders according to the invention without the need of additional driving cylinders. Furthermore, the holder may simply be combined with members for the adjustment of electrodes and separators with respect to one another, making unnecessary any special equipment for this purpose.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

We claim:

1. Apparatus for firmly holding electrode sets during the manufacture of electrical batteries, said apparatus comprising:
   a plurality of laterally spaced partitions for separating sets of electrodes;
   spaced partition holders each carrying some of said partitions;
   said partition holders being movable toward one another to close around electrode sets disposed therebetween;
   a plurality of wedges disposed substantially coplanar with said partitions;
   said wedges being wider than said partitions;
   spaced wedge holders each carrying some of said wedges;
   said wedge holders being movable toward one another to move said wedges into overlying relation with said partitions to hold said electrode sets tightly.

2. Apparatus according to claim 1 including bottom plate means disposed below said partitions and said wedges to form a floor beneath the electrode sets.

3. Apparatus according to claim 1 wherein said partition holders and said wedge holders are disposed in parallel relation; and spring means operably interposed between at least one partition holder and wedge holder to transfer movement from said wedge holder to said partition holder and thereafter permit relative movement therebetween as said wedge holder continues to move.

4. Apparatus according to claim 3 wherein said spring means comprises a coil spring disposed between said partition holder and said wedge holder; and an adjustable bolt fixed in the partition holder and extending freely through the wedge holder to adjust the compression of said spring.

5. Apparatus according to claim 1 wherein each wedge comprises upper and lower coplanar wedge sections disposed above and below the associated coplanar partition.

6. Apparatus according to claim 5 wherein spring means is provided to transfer movement from said wedge holder to said partition holder.

7. Apparatus according to claim 4 wherein said partition holders are arranged to finish closing about the electrode sets prior to the occurrence of relative movement between said wedges and said partitions permitted by said spring means.

8. Apparatus according to claim 1 wherein said partition holders are movable to shut positions to define a spacing dimensioned to accommodate separator elements of the electrode set.

9. Apparatus according to claim 8 wherein said partition holders include blades projecting inwardly so that with said partition holders in their shut position, said blades define a spacing shorter than said separator spacing to accommodate electrode elements of said electrode set.

10. Apparatus according to claim 1 further comprising a second plurality of laterally spaced partitions for separating second sets of electrodes; second spaced partition holders each carrying some of said second partitions; said second partition holders being movable toward one another to close around second electrode sets disposed therebetween; a plurality of second wedges disposed substantially coplanar with said second partitions; said second wedges being wider than said second partitions; second spaced wedge holders each carrying some of said second wedges; and means connecting said first-named wedge holders to said second wedge holders so that movement of said first-named wedge holders produces simultaneous movement of said second wedge holders to move said second wedges into overlying relation with said second partitions to hold the second electrode sets tightly.

11. Apparatus according to claim 1 wherein with said partition holders in an open position the spacing therebetween is large enough to accommodate an electrode set and cell connector connected thereto to permit said electrode set to be removed from the opposite end of the spacing.

12. A holder for electrode sets during the manufacture of a battery comprising:
at least one partition holder carrying a plurality of partitions;
means cooperating with said partition holder to form a space for receiving electrode sets separated by said partitions;
a wedge holder spaced behind said partition holder and carrying a plurality of wedges arranged coplanar relative to said partitions;
said wedges being wider than said partitions;
said partition holder and said wedge holder each being movable inwardly, with said wedge holder being movable relative to said partition holder; means for transferring motion from said wedge holder to said partition holder so that said partition holder closes around the electrode sets and then said wedge holder continues inwardly relative to said partition holder so that said wedges overlie said partitions and tightly hold the electrode sets.

* * * * *